(12) United States Patent
Ravji et al.

(10) Patent No.: US 9,591,865 B2
(45) Date of Patent: Mar. 14, 2017

(54) CONTAINER FOR A DEVICE FOR PREPARING A FROZEN CONFECTION AND DEVICE FOR PREPARING A FROZEN CONFECTION

(75) Inventors: Sejal Jayantilal Ravji, Beauvais (FR); Thomas Koob, Boves (FR); Sven Zwicker, St. Gallen (CH)

(73) Assignee: Nestec S.A., Vevey (CH)

( * ) Notice: Subject to any disclaimer, the term of this patent is extended or adjusted under 35 U.S.C. 154(b) by 194 days.

(21) Appl. No.: 13/379,193

(22) PCT Filed: Jun. 11, 2010

(86) PCT No.: PCT/EP2010/058216
§ 371 (c)(1),
(2), (4) Date: Dec. 19, 2011

(87) PCT Pub. No.: WO2010/149511
PCT Pub. Date: Dec. 29, 2010

(65) Prior Publication Data
US 2012/0096875 A1    Apr. 26, 2012

(30) Foreign Application Priority Data

Jun. 26, 2009  (EP) .................................... 09163867

(51) Int. Cl.
*F25C 5/14*    (2006.01)
*F25C 1/00*    (2006.01)
(Continued)

(52) U.S. Cl.
CPC ................ *A23G 9/08* (2013.01); *A23G 9/28* (2013.01); *B65D 83/0055* (2013.01); *B65D 85/78* (2013.01)

(58) Field of Classification Search
CPC . A23G 9/08; A23G 9/28; A23G 9/281; B65D 83/0055; B65D 85/78
(Continued)

(56) References Cited

U.S. PATENT DOCUMENTS

| 4,540,288 A | 9/1985 | Pandolfi |
| 4,573,329 A | 3/1986 | Cavalli |

(Continued)

FOREIGN PATENT DOCUMENTS

| BE | 901125 | 3/1985 |
| DE | 3921115 | 1/1991 |

(Continued)

OTHER PUBLICATIONS

PCT International Search Report for Application No. PCT/EP2010/058216 mailed on Jun. 11, 2010.

(Continued)

*Primary Examiner* — Ryan J Walters
*Assistant Examiner* — Joseph Trpisovsky
(74) *Attorney, Agent, or Firm* — K&L Gates LLP (57) ABSTRACT

The present invention relates to a container (20) designed for being inserted into a device (1) for preparing a frozen confection (17), said container (20) comprising a sealed flexible casing (25) and said container (20) containing ingredients (15) for producing a frozen confection (17) when being cooled and mechanically forced. The present invention further relates to a device (1) for preparing a frozen confection (17) from a container (20) inserted into the device (1). The present invention further relates to a method for preparing a frozen confection.

10 Claims, 10 Drawing Sheets

(51) Int. Cl.
*F25B 21/02* (2006.01)
*F25D 25/00* (2006.01)
*A23G 9/08* (2006.01)
*A23G 9/28* (2006.01)
*B65D 83/00* (2006.01)
*B65D 85/78* (2006.01)

(58) Field of Classification Search
USPC ............ 62/66, 3.2, 3.63, 62, 341, 348
See application file for complete search history.

(56) References Cited

U.S. PATENT DOCUMENTS

| | | | |
|---|---|---|---|
| 4,583,863 A | | 4/1986 | Pandolfi |
| 5,363,746 A | * | 11/1994 | Gordon ............................ 99/328 |
| 5,549,042 A | | 8/1996 | Bukoschek et al. |
| 5,823,675 A | | 10/1998 | Myerly |
| 5,967,381 A | * | 10/1999 | van Zeeland et al. ........ 222/325 |
| 6,041,614 A | | 3/2000 | Yamaya et al. |
| 6,267,049 B1 | | 7/2001 | Silvano |
| 6,298,688 B1 | | 10/2001 | Brostow et al. |
| 6,820,765 B2 | * | 11/2004 | Pahl ................................. 222/95 |
| 6,863,916 B2 | | 3/2005 | Henriksen et al. |
| 2004/0045312 A1 | | 3/2004 | Bonato et al. |
| 2004/0161503 A1 | * | 8/2004 | Malone et al. ................ 426/101 |
| 2005/0178796 A1 | * | 8/2005 | Shraiber ........................... 222/78 |
| 2005/0189375 A1 | * | 9/2005 | Mcgill ................................ 222/1 |
| 2006/0110515 A1 | * | 5/2006 | Waletzko et al. ............. 426/565 |
| 2007/0181604 A1 | * | 8/2007 | Rusch ............................ 222/306 |

FOREIGN PATENT DOCUMENTS

| | | |
|---|---|---|
| EP | 106814 | 4/1984 |
| EP | 0179027 | 4/1986 |
| EP | 0596722 | 5/1994 |
| JP | 2001017090 | 1/2001 |
| WO | 8606936 | 12/1986 |
| WO | 8807330 | 10/1988 |
| WO | 9005697 | 5/1990 |
| WO | 9601224 | 1/1996 |
| WO | 9611583 | 4/1996 |
| WO | 0160184 | 8/2001 |
| WO | 2004054380 | 7/2004 |
| WO | 2004089104 | 10/2004 |
| WO | 2006043298 | 4/2006 |

OTHER PUBLICATIONS

Written Opinion of the PCT International Searching Authority for Application No. PCT/EP2010/058216 mailed on Jun. 11, 2010.

* cited by examiner

CONTAINER FOR A DEVICE FOR PREPARING A FROZEN CONFECTION AND DEVICE FOR PREPARING A FROZEN CONFECTION

CROSS REFERENCE TO RELATED APPLICATIONS

The present application is a National Stage of International Application No. PCT/EP2010/058216, filed on Jun. 11, 2010, which claims priority to European Patent Application No. 09163867.6, filed on Jun. 26, 2009, the entire contents of which are being incorporated herein by reference.

The present invention relates to a container designed for being inserted into a device for preparing a frozen confection and to a device for preparing a frozen confection. Specifically, the present invention relates to the field of preparing a single serving freshly made frozen confection.

Current domestic ice cream makers on the market rely on scraped heat exchangers using a horizontal or tubular bowl. These systems utilize conventional compression cooling technology with CFC, HFC, HC, $CO_2$, other chemical refrigerants or thermoelectric (peltier) systems. Such systems are for example disclosed in documents WO8606936, U.S. Pat. No. 4,540,288, U.S. Pat. No. 6,267,049, WO2006043298, WO2004089104, U.S. Pat. No. 5,549,042, U.S. Pat. No. 5,823,675, U.S. Pat. No. 5,823,675, U.S. Pat. No. 6,298,668, JP2001017090, U.S. Pat. No. 6,863,916, WO9611583, DE3921115, WO8807330, BE901125, EP106814, EP0179027, U.S. Pat. No. 4,583,863, US 2004045312, or U.S. Pat. No. 6,041,614.

These ice cream makers produce large volumes of ice cream ranging from 0.5 l to 1 l in a time period of 20 to 60 minutes. The ice cream must then be removed from the bowl manually or at best requires overall cleaning cycles after dispensing.

It is therefore an object of the present invention to improve the prior art. Specifically, it is an object of the present invention to provide a possibility to prepare freshly made single portions of frozen confection without the need for cleaning cycles. Furthermore, it is an object of the present invention to provide a possibility to prepare freshly made single portions of frozen confection in a short period of time compared to the existing ice cream maker machines.

This object is solved by the independent claims.

Further features and embodiments are subject matter of the dependent claims.

Further features, advantages and objects of the present invention will become evident by means of the figures of the enclosed drawings as well as by the following detailed explanation of illustrative-only embodiments of the present invention.

The present invention proposes a container which is designed for being inserted into a device for preparing a frozen confection. The container has a flexible casing, which has an opening that can be closed or sealed. The container comprises ingredients within the flexible casing for producing a frozen confection when being cooled and mechanically forced simultaneously. The ingredients enable the preparation of frozen confection in situ.

The present invention further relates to a device for preparing a frozen confection when the container is inserted into the device. The device is adapted to cool the container and to apply a mechanical force to the container.

Since the container has a flexible casing the mechanical force is transferred through the container walls and consequently applied to the ingredients within the container. Since the material of the container further preferably has a low thickness, so that the heat transfer resistance across the casing is minimal, the ingredients within the container are effectively cooled. The material of the container can comprise one or more material parts or material components.

The present invention thus provides a device, which comprises means to receive the container, to cool the container and to apply a mechanical force to the container, so that by cooling and applying a mechanical force to the ingredients within the container a frozen confection can be prepared.

Figure 1:
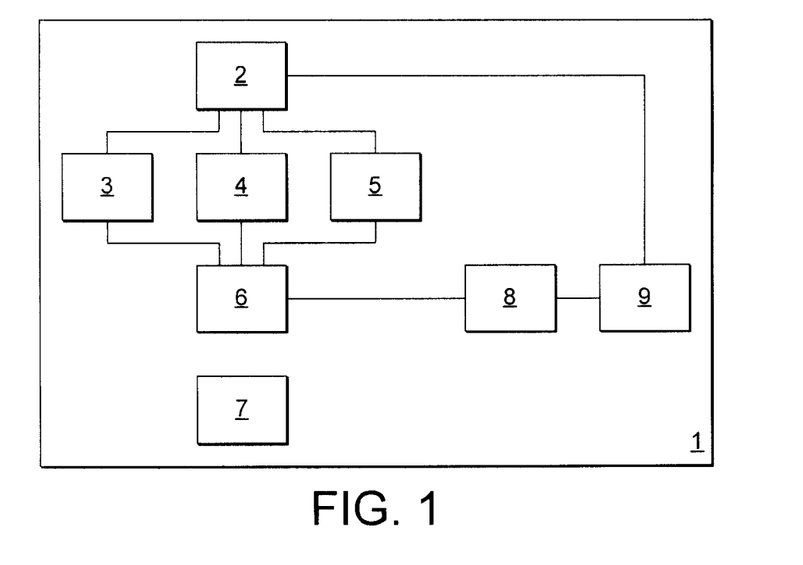
FIG. 1 shows a schematic block diagram of the components of a device for preparing a frozen confection according to the present invention.

FIG. 1 shows a schematic block diagram of a device 1 for preparing a frozen confection according to the present invention. The device 1 comprises a cooling element 6 which is adapted to receive the container. The cooling element 6 serves as a heat exchanger of the refrigeration system. It withdraws the heat energy from the container and its enclosed confection. The cooling element 6 can be flat or can provide a recess into which the container is inserted. The cooling element 6 further can have any possible shape being of the same size, smaller or larger than the container. The cooling element 6 further is made of a material which provides excellent heat transfer properties.

The device 1 further comprises a cooling unit 8 which is adapted to cool the cooling element 6. Since the cooling element 6 comprises an excellent heat conductivity the container when being in touch with the cooling element 6 is cooled. The cooling unit 8 can comprise any refrigeration and/or circulatory heat transfer system to cool the cooling element 6 and consequently the container as rapidly as possible. Further a defrosting system can also be included into the cooling unit 8 in order to minimize the frosting of the cooling element 6. Either a defrosting plate or a dryer air circulation using dehumidified air can be provided.

Optionally, the device 1 can comprise a defrosting system to minimize the frosting of any heat exchanging parts. The defrosting system is for example a hot gas defrost system that can comprise a switchable reversed compressor gas flow valve, a defrosting plate and/or a dry air circulation system with the humidified air.

In case defrosting of the internal heat exchange surface is necessary and the cooling unit 8 is conventional vapour compression/evaporation, an automatic defrosting mechanism is provided by means of a reversible and controllable hot gas defrost valve which allows just sufficient quantities of hot gas from the cooling unit 8 to be forced into or next to the cooling element 6 such that the temperature of the heat exchange surface is raised to a predetermined temperature and the surface is defrosted.

In case defrosting of the internal heat exchange surface is necessary and the cooling unit 8 is thermoelectric (peltier) powered, an automatic electronic switch will reverse the polarity of the electric circuit powering the thermoelectric devices such that cool and hot-sides of the devices are reversed and the cool-side of the thermoelectric devices becomes the hot-side and the hot-side becomes cold-side such that the temperature of the heat exchange surface is raised to a predetermined temperature and the surface is defrosted.

The device further comprises a processing unit 3 which is adapted to apply the necessary mechanical force to the container when inserted into the device 1. The processing unit 3 preferably comprises a scraping, grinding or kneading assembly which externally processes the ingredients inside the container through the flexible container walls and scrapes, grinds or kneads the ingredients during cooling. In addition, the scraping, grinding or kneading assembly facilitates the mixing and causes shear forces within the ingredient mix during the cooling (and therefore also freezing) process. The latter is the key for achieving a good overrun of the final frozen product.

The processing unit 3 can consist of a combination of one or more shapes, including hard spherical balls, cones, polygonal scraping blocks or the like. These objects can be fixed, freely moving or forced to move. The processing unit 3 is provided to scrape the surface of the container during the cooling of the container and to also develop the overrun of the final frozen confection product.

Optionally, the device 1 can comprise an opening unit 4 which is adapted to open the container after the preparation of the frozen confection, so that the frozen confection can be dispensed through the opening from the container. Alternatively, the opening unit 4 can also be omitted and a manual opening by a user can be provided.

The device 1 further comprises a dispensing unit 5 which is adapted to dispense the prepared frozen confection from the container after the container has been opened either manually by a user or by the opening unit 4. The dispensing unit 5 thus forces the freshly made frozen confection through the opening of the container.

In a preferred embodiment the device 1 comprises a motor 2. The motor 2 is adapted to drive the processing unit 3 and to provide the necessary force or torque, so that the necessary movement and force can be provided to apply the mechanical force to the container. In an alternative embodiment, the motor 2 can also be omitted and there can be provided means, e. g. a crank handle, which allow the user to manually drive the processing unit 3.

In case that a motor 2 is provided the motor 2 can also be used to drive the opening unit 4 and/or the dispensing unit 5. Alternatively, one or both units are only activated manually or by other means such as the use of additional motors as required to perform separate operations individually for processing and dispensing.

Additionally, the device 1 comprises an activation mechanism 9 which is adapted to activate the whole processing. The activation mechanism 9 starts the cooling by the cooling unit 8 and in case that a motor 2 is provided the activation mechanism starts the motor 2. If the motor is omitted or if the motor only drives a part of the units, then the activation mechanism can be directly connected with the respective units and activate the respective units directly.

Also shown in FIG. 1 is a retainer 7 which is adapted to receive the frozen confection when dispensed from the container. The retainer 7 is of course removable from the device 1.

Figure 2:
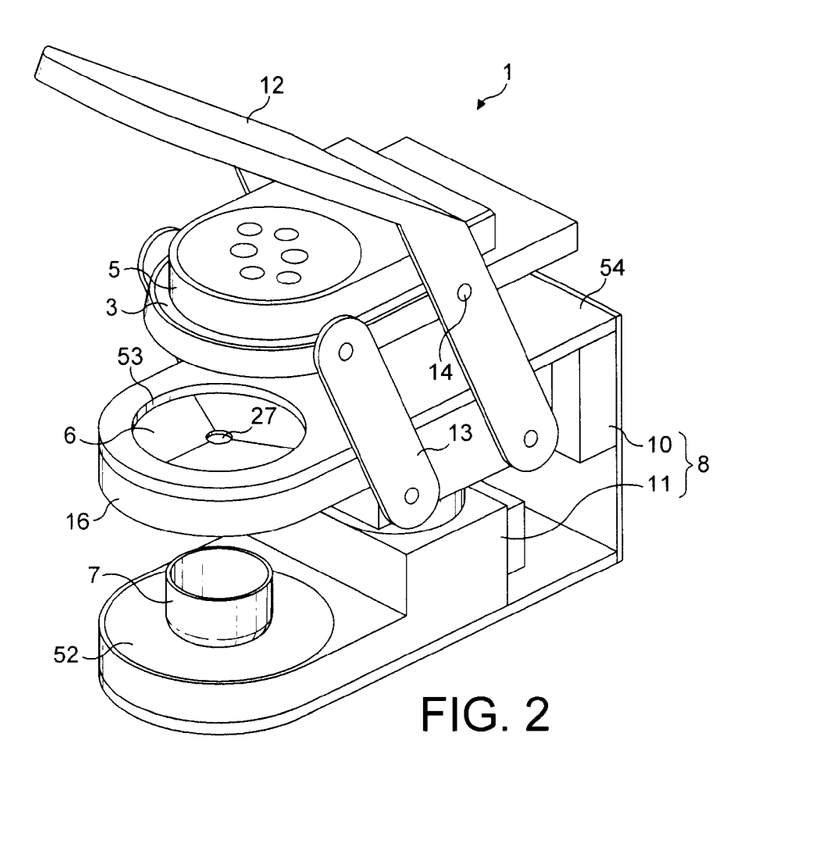
FIGS. 2 and 3 show different views of a preferred embodiment of a device for preparing a frozen confection according to the present invention.
Figure 3:
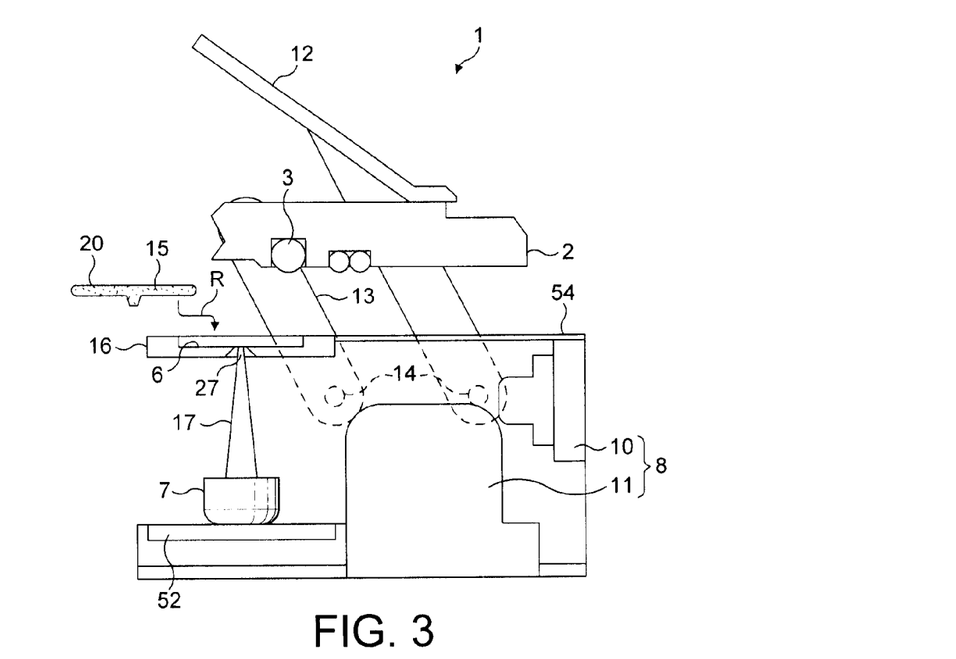

FIGS. 2 and 3 show a preferred embodiment of a device for preparing a frozen confection according to the present invention. It is to be noted that FIGS. 2 and 3 are only examples and that the present invention comprises also every other structure and shape of a device for preparing a frozen confection falling under the scope of the present claims.

FIG. 2 shows a perspective side view of a device 1 according to the present invention. FIG. 3 shows a cross section of a device 1 according to the present invention.

The device 1 comprises a casing 54 which houses several components of the device 1. Provided within the casing 54 are a condenser 10 and a compressor 11 (in the case of conventional vapour compression refrigeration), which form the cooling unit 8. At the bottom part of the casing 54 a support 52 is provided which is adapted to receive a retainer 7 thereon, into which the prepared frozen confection 17 can be filled. The support 52 in one embodiment can also be cooled by the cooling unit 8.

Above the support 52 and in parallel to the support 52 a part of the casing 54 is protruding and forms a protruding portion 16 into which the cooling element 6 is integrated, which in the preferred embodiment has the shape of a plate. As shown in FIG. 2 the protruding portion 16 can comprise a recess 53, so that the surface of the cooling element 6 is lower than the surface of the protruding portion 16. Into this recess 53 a container 20 can then be inserted.

It is to be noted that the cooling element 6 according to the present invention can have any possible shape, which is adapted to receive and cool a corresponding container 20. The cooling element can be flat or of a bowl-like shape adapted to receive the container 20 therein. The cooling element 20 can have a circular, elliptical or any other type of roundish shape being either a substantially flat plate or being a hollow receptacle, e.g. a hollow cylinder or the like. Alternatively, the cooling element 6 can have a rectangular or any other shape being either a flat plat or a hollow receptacle. In any case, the shape of the cooling element is adapted to the shape of the container 20 to allow for a good heat exchange and cooling.

A container 20 is exemplary shown in FIG. 3. The container 20 contains ingredients 15 for producing a frozen confection when being cooled and mechanically forced. As indicated by arrow R the container 20 can be positioned onto the cooling element 6. In case that a recess 53 is provided and according to a preferred embodiment the container 20 when posed onto the cooling element 6 does not protrude the protruding portion 16.

The device 1 further comprises the processing unit 3 and the dispensing unit 5. In a preferred embodiment those two units are integrated into one upper component 56 of the device 1. The processing unit 3 and the dispensing unit 5 are movable with respect to the protruding portion 16 and the cooling element 6. Specifically, the processing unit 3 can be moved away from the protruding portion 16, so that the container 20 can be placed onto the cooling element 6.

Afterwards, the processing unit 3 can be moved into direction of the container 20, so that the processing unit 3 is in direct contact with the container 20. The shape of the processing unit 3 is adapted to the shape of the container 20 in order to enable the processing of all parts of the container 20. In case that the dispensing unit 5 is also provided within the upper component 56 of the device 1, also the dispensing unit 5 is brought in contact with the container 20 and can then be activated after the frozen confection has been prepared.

In the embodiment shown in FIGS. 2 and 3, the processing unit 3 and the dispensing unit 5 are integrated into the upper component 56 which is movable with respect to the protruding portion 16 by means of a connector 13 and a lever 12. The lever 12 via pivots 14 is movably connected to the casing 54 and to the upper component 56. A part of the lever 12 protrudes the upper component 56 and can be grabbed by a customer. Likewise, a connector 13 by pivots 14 is movably connected to the casing 54 and to the upper component 56 comprising the processing unit 3. If the lever 12 is moved, this results also in a movement of the processing unit 3 with respect to the protruding portion 16. By operating the lever 12 thereby the processing unit 3 can be placed onto the container 20 or removed therefrom.

It is further possible to provide an additional mechanism to provide a two-step operation of the lever 12. After placing the container 20 onto the cooling element 6, the user by a very light force is enabled to position the processing unit 3 onto the container 20. For moving the lever 12 further the user would have to exceed a predefined force. After the preparation of the frozen confection, then the user has to exceed said specific amount of force to further push the lever 12 in order to activate the dispensing unit 5.

In an alternative embodiment, all components of the device 1 can be controlled electronically and automatically, e.g. by pressing one or more corresponding control buttons or switches. The user after having inserted the container 20 into the device can then activate the mechanism, and afterwards the processing unit 3 is automatically placed onto the container 20 and after preparation of the frozen confection the dispensing unit 5 is automatically activated.

The cooling element 6 preferably comprises an aperture 27 through which the prepared frozen confection 17 can be dispensed into the retainer 7. Alternatively, the aperture 27 can also be provided within a part of the protruding portion 16. The aperture 27 can have different positions within the plate 6 depending on the type of the used container 20. In any case the aperture 27 has to be in line with an opening of the container 20 to allow the dispensing of the frozen confection 17 through the opening of the container 20 and through the aperture 27.

In the following, different embodiments of the container will be explained in more detail. Generally, the container comprises a flexible casing, so that when the processing unit 3 is activated, a mechanical force can be applied to the ingredients 15 within the container 20. The physical properties of the casing of the container 20 allow energy to be transferred from the ingredients 15 to an external source, i.e. heat energy to be transferred from the ingredients 15 to the cooling element 6.

The ingredients preferably comprise a chilled or shelf-stable confection and a gaseous phase, e.g. air. In a preferred embodiment the amount of confection ranges from 50 to 70% and the rest of the container is filled with gas. The ingredients 15 hereby provide a single portion of frozen confection 17.

Specifically, the single portion of chilled or shelf-stable confection mix is capable of producing between 80 to 200 ml of frozen confection. Instead of air also any other type of gas can be provided within the container 20 to allow for aeration and overrun. Alternatively or additionally, nitrogen can be provided within the container 20 for aseptic filling and extended shelf life.

The container 20 is specifically made from materials with an erosion resistance and mechanically strong properties. Thin dimensions allow for good heat transfer properties.

In a preferred embodiment the container 20 is made from disposable and potentially recyclable materials.

When used in the present invention the term "frozen confection" is intended to refer to different types of frozen confection. Non limiting examples are ice cream, sorbet, sherbet, water ice, frozen yogurt, frozen dairy, soft ice, Mellorine, frozen custard, non-dairy frozen confection, milk ice, ice lolly, gelato or frozen jelly.

Figure 4A:
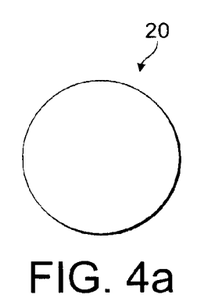
FIGS. 4a to 4d show different shapes of a container according to the present invention.
Figure 4B:
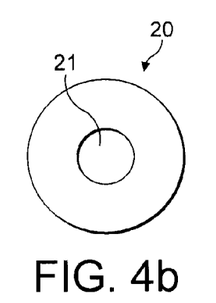

In FIGS. 4a to 4d different possible but not limiting shapes of the container 20 are shown. In a preferred embodiment the container 20 comprises a circular shape as shown in FIG. 4a. In an alternative embodiment as shown in FIG. 4b the container 20 can have a ring-like shape with a gap 21 or alternatively a sealed surface in the middle of the container 20.

Figure 4C:
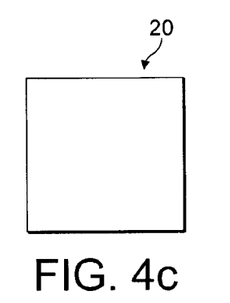
Figure 4D:
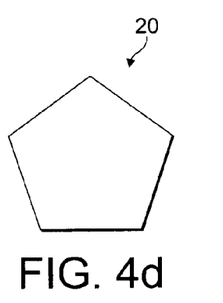

Alternatively, the container can have a rectangular shape as shown in FIG. 4c or can have a polygonal shape as shown in FIG. 4d.

The container 20 according to the present invention is not limited to the shown embodiments but comprises any other shape either with one or more gaps or without gap which fall under the scope of protection of the present invention. The container 20 alternatively or additionally can also have one or more sealed surfaces.

Generally the container 20 is moulded to its final design and comprises at least one part having therein the confection and optionally at least one part of sealed surfaces, which may form a shaped sleeve and which contain no confection. In addition to sealing the container 20 the sealed surfaces also allow to keep the container 20 in shape.

Since the container 20 has a casing made of a flexible material, in a preferred embodiment means are provided to keep the container 20 in shape and/or leak tight. This ensures an equal distribution of the ingredients 15 between the cooling element 6 and the processing unit 3. Thereby, a uniform cooling and application of mechanical force to the ingredients 15 is assured. In FIGS. 5a to 5d different possibilities of keeping the container 20 in a pre-defined shape are shown. Typically, the container shows a large surface to volume ratio for an efficient heat transfer.

Figure 5A:
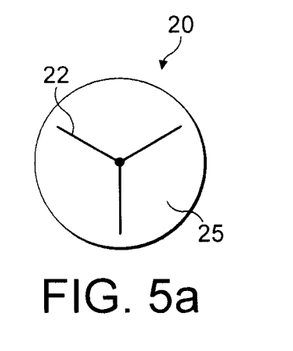
FIGS. 5a to 5d show different embodiments of stabilizing the container according to the present invention.

FIG. 5a shows an embodiment where on one or two sides of the flexible casing 25 an exoskeleton 22 is provided. In the embodiment shown in FIG. 5a the exoskeleton 22 comprises three bars being connected with each other at a central point of the container 20. In this case, preferably, the sealed surface is provided at the outer border of container.

Figure 5B:
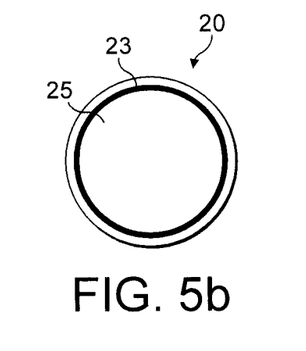

FIG. 5b shows a second embodiment, where a circumferential ring 23 is provided on one or two sides of the flexible casing 25 in order to keep the shape of the container 20. Alternatively or additionally, a sealed surface surrounding the container 20 can be provided for sealing the container 20 and keeping the container 20 in shape.

It is to be noted that an exoskeleton or a ring running along the outer diameter of the container 20 as well as a sealed surface can also be provided with different shapes of the container 20.

Figure 5C:
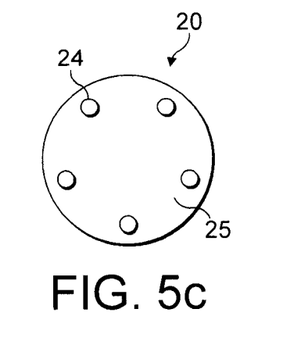

FIG. 5*c* shows a further embodiment how the container 20 can be kept in shape when being inserted into the device 1. In this embodiment plugs 24 are provided on one side of the container 20, which are adapted to be inserted into corresponding holes provided in the cooling element 6. In the embodiment shown in FIG. 5*c* five bars 24 along the border of the container 20 are provided, but any other number and positioning of the bars 24 is possible.

Figure 5D:
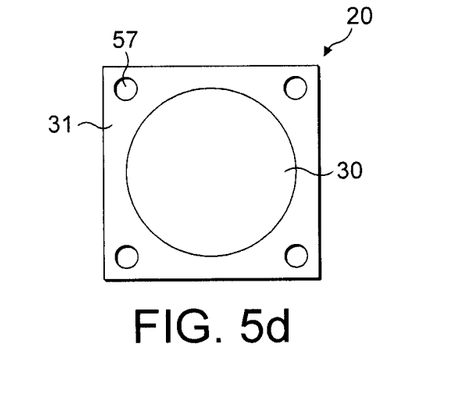

FIG. 5*d* shows a further embodiment of a container. In this embodiment the container comprises a central circular portion 30 having therein the confection. The central potion 30 is surrounded by a rectangular sealed surface or a border 31. This sealed surface in the present embodiment has two functions. On one hand the sealed surface seals the part of the container 20 comprising the confection and thereby keeps the container 20 leak tight. On the other, the sealed surface keeps the container 20 in shape.

In this embodiment, perforations 57 are provided within the sealed surface or the border 31 of the container 20, which are adapted to fit onto corresponding bars, pins or plugs on the device 1.

To summarize, preferably a sealed surface is provided for sealing the container 20 and keeping the portion of the container 20 comprising the confection leak tight. The sealed surface can have a shape and/or provided at specific positions of the container 20 to keep the container in shape. For keeping the container in shape, alternatively or additionally, an exoskeleton 22, a circumferential ring 23 or any other additional means for providing stability can be added to the container 20.

In a further embodiment, the container comprises means for attaching the container 20 to the device 1, thereby also allowing to keep the container 20 in shape and to provide the necessary stability of the container 20 during the production of the frozen confection.

Figure 6A:
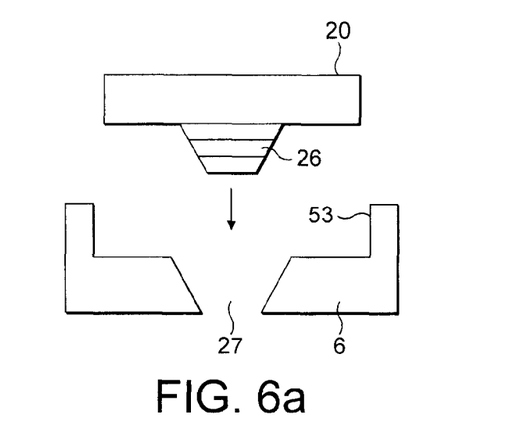
FIGS. 6a to 6c show different embodiments of inserting the container into the device for preparing a frozen confection according to the present invention.

FIG. 6*a* shows a first example how the container 20 can be put onto the cooling element 6. In this exemplary embodiment the container 20 comprises an opening 26 in the middle of the container 20. The opening 26 can also be provided at any other position, e.g. at the side of the container 20. The cooling element 6 comprises an aperture 27 which is positioned in such a way that the opening 26 of the container 20 can be inserted into the aperture 27 and/or is in line with the aperture 27. FIG. 6*a* hereby shows the case that the container 20 comprises an exoskeleton or a ring keeping the container 20 in shape, but this is an optional implementation.

Figure 6B:
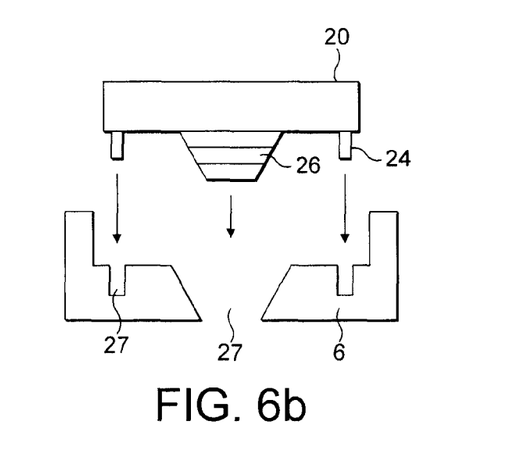

FIG. 6*b* shows a further embodiment of positioning the container 20 onto the cooling element 6. In this embodiment bars 24 as previously explained are protruding from the container 20 and can be inserted into corresponding holes 55 in the cooling element 6. Thereby, the container 20 is fixedly hold to the cooling element 6 and keeps its shape when the processing unit 3 applies a mechanical force to the container 20.

Figure 6C:
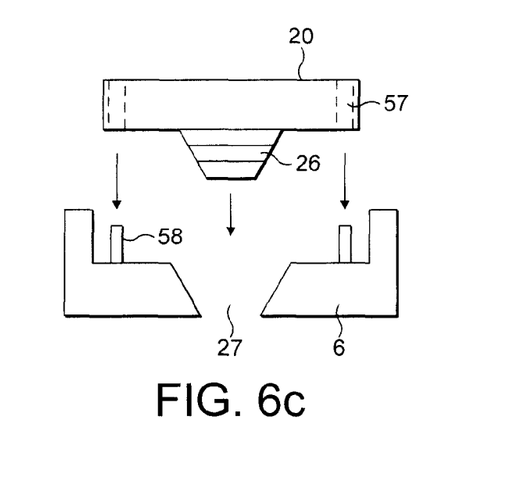

FIG. 6*c* shows a further embodiment of positions the container 20 onto the cooling element 6. In this embodiment the container 20 has a border 31 or sealed surface having therein perforations 57 which fit onto corresponding pins 58 attached to the device 1.

It is to be noted, that any features of one aforementioned embodiment can be implemented into on or more other embodiments where possible and the present invention is not limited to the above described combinations of features.

In the following, different embodiments of the opening 26 provided within the container 20 are explained. The opening 26 is closed or sealed, so that during the cooling and the application of mechanical force by the processing unit 3 the ingredients 15 and/or the prepared frozen confection 17 can not leak from the container 20. After the preparation of the frozen convection 17, the opening 26 can be opened, e. g. for removing a seal, or by breaking a seal or removing a plug, so that the frozen confection 17 can be dispensed from the container 20. Generally, the opening 26 is a sealed aperture or spout and can be either manually or automatically broken, torn, ruptured or the like. As previously explained, either an opening unit 4 can be provided within the device 1 which automatically opens the container 20 after the preparation of the frozen confection 17. Alternatively, the user can approach the opening 26 and manually remove or break the seal.

Figure 7A:
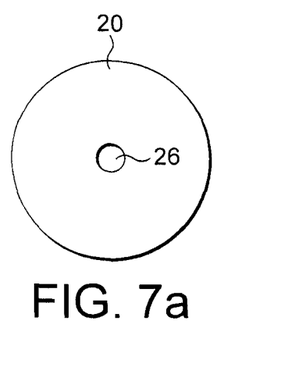
FIGS. 7a to 7c show a first embodiment of an opening unit within a container according to the present invention.
Figure 7B:
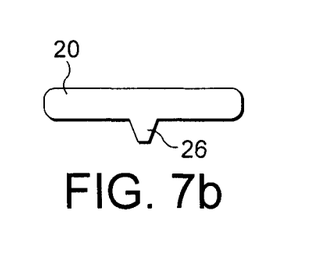

FIG. 7*a* shows a first embodiment where the opening 26 is provided in the middle of the container 20. FIG. 7*b* is a side view of the container and shows that the opening 26 is provided on one side of the container in the middle of the container 20 and protrudes the container 20.

Figure 7C:
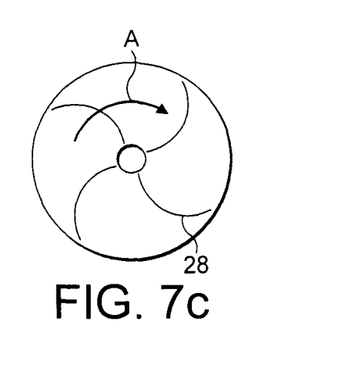

FIG. 7*c* shows a possible configuration how the dispensing of the prepared frozen confection 17 could be accomplished with a container having an opening 26 in the middle. Within the container 20 flow lines 28 can be provided. For dispensing the frozen confection 17 the processing unit 3 and/or the dispensing unit 5 applies a movement in the direction as shown with arrow A. Thereby by the flow lines 28 the frozen confection 17 is guided to the central opening 26 and dispensed from the container. This first embodiment thus proposes a flow lobe to the centre.

Figure 8A:
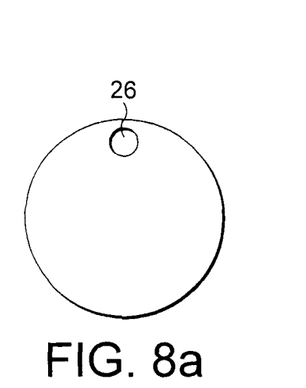
FIGS. 8a to 8c show a second embodiment of an opening unit within a container according to the present invention.
Figure 8B:
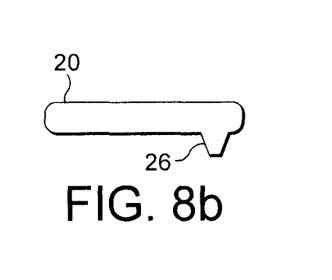
Figure 8C:
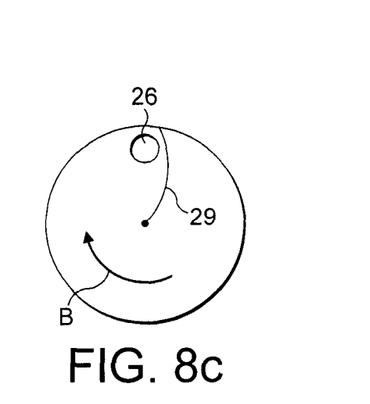

FIG. 8*a* shows a second embodiment, where the opening 26 is provided on one side of the container 20 and near the boarder of the container 20. FIG. 8*b* shows a corresponding side view of the container 20. FIG. 8*c* shows one possible configuration how the frozen confection 17 could be dispensed from the container 20. A barrier 29 can be provided within the container near the opening 26 so that when the frozen confection 17 is forced into a direction as indicated by arrow B the frozen confection 17 is dispensed through the opening 26 since it can not go beyond the barrier 29. This second embodiment thus provides a flow lobe to the side.

Figure 9A:
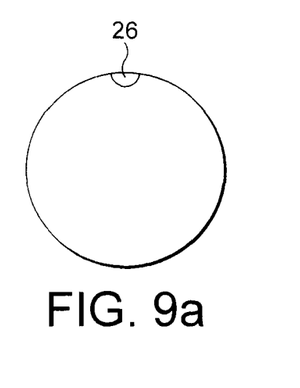
FIGS. 9a to 9c show a third embodiment of an opening unit within a container according to the present invention.
Figures 9B, 9C:
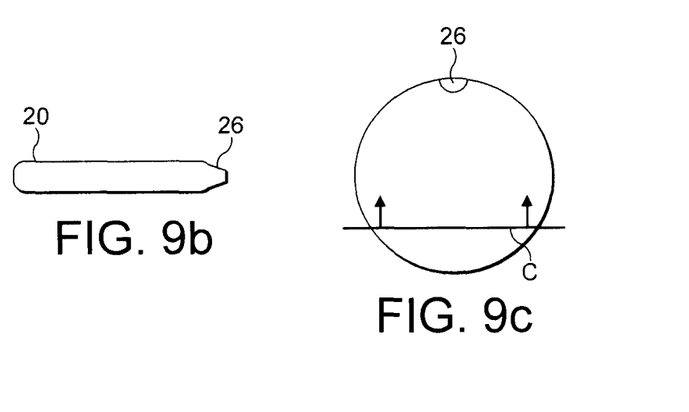

FIG. 9*a* shows a third embodiment of an opening 26 according to the present invention. In this case the opening 26 is provided at the side of the container 20. The opening 26 is thus integrated in the boarder of the container 20 and thus provides an interior side orifice. FIG. 9*c* shows a possible configuration how the frozen confection 17 can be dispensed from the container 20. A transverse movement direction indicated by a bar included in the device 1 which moves into direction as shown with arrows C can force the frozen confection 17 out through the opening 26.

In a preferred embodiment, the container 20 comprises a side opening 26 as shown in FIG. 8*a* and the frozen confection is dispensed from the container 10 by a bar moving transversely along the container as shown in FIG. 9*c*.

Figures 10A, 10B:
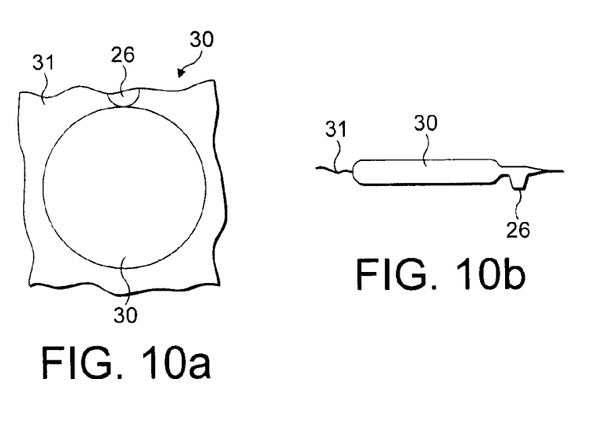
FIGS. 10a to 10c show a fourth embodiment of an opening unit within a container according to the present invention.

FIG. 10*a* shows a further configuration of a container 20 according to the present invention comprising a fourth configuration of an opening 26. In this case the container 20 comprises a central portion 30 which contains the ingredients 15 and a border 31. In this case an exterior side orifice is provided as opening 26 and the opening 26 is provided within the boarder 31.

Figure 10C:
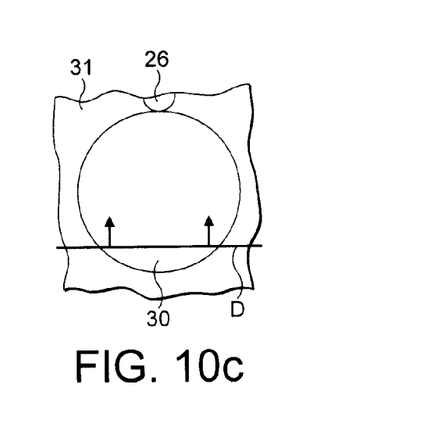

FIG. 10b shows a side view and shows that the opening is provided on one side of the boarder 31 and protruding the boarder. The opening 26 allows the frozen confection 17 to exit the central portion 30 to flow through the opening and to be dispensed from the container 20. FIG. 10c again shows a possible configuration how the frozen confection 17 could be dispensed from the container 20. Again a transverse movement direction indicated by arrows D can force the frozen confection 17 out of the container 20.

Figures 11A, 11B:
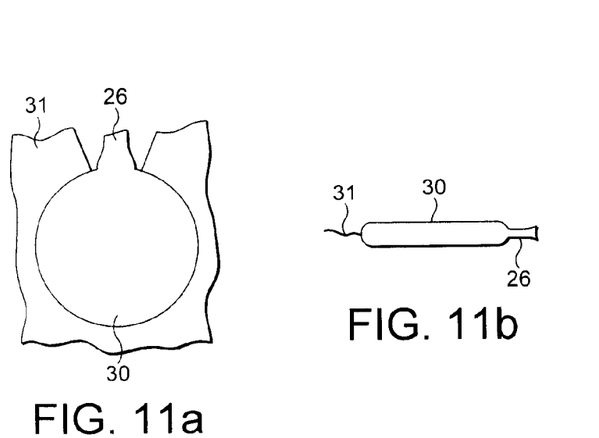
FIG. 11a to 11c show a fifth embodiment of an opening unit within a container according to the present invention.
Figure 11C:
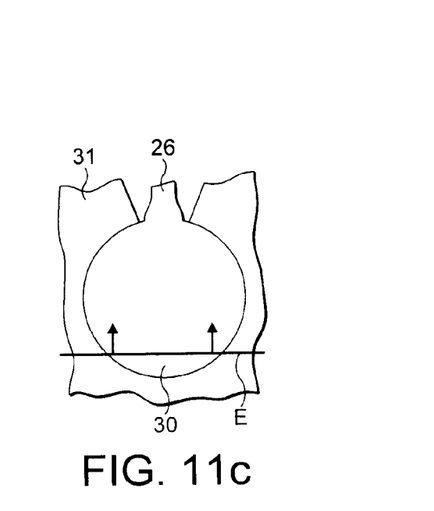

FIG. 11a shows a fifth embodiment of an opening 26 according to the present invention. This embodiment proposes a side spout within a container 20 having again a central portion 30 and a boarder 31. FIG. 11b shows a side view of the container 20. As can be seen, the opening is provided within the border 31 and thus provides a channel within the border 31 through which the frozen confection 17 can be dispensed. As shown in FIG. 11c, also in this configuration a transverse movement into the direction indicated with arrow E can dispense the prepared frozen confection 17 from the container.

In the following, several possible dispensing mechanisms will be explained. In a first possibility the dispensing unit 5 can be identical to the processing unit 3. If for example flow lines 28 as previously described are provided, then after the seal of the opening 26 has been broken or removed, the flow lines 28 guide the frozen confection 17 to the opening 26.

Alternatively, the dispensing unit 5 can be provided as separate dispensing unit and provided within the same upper component 56 as the processing unit 3. In a further alternative embodiment the dispensing unit 5 can be provided as separate component and partly or completely integrated in the protruding portion 16 or into any other component of the device 1 enabling the dispensing unit 5 to dispense the frozen confection 17 from the container.

Figure 12A:
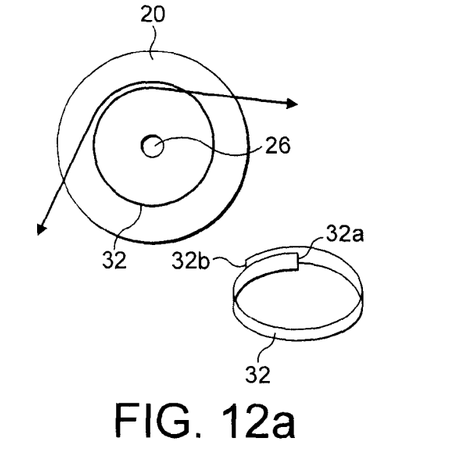
FIGS. 12a to 12l show different embodiments of a dispensing mechanism according to the present invention.

FIG. 12a shows a first embodiment of a dispensing mechanism according to the present invention.

In this case the container 20 comprises an opening 26 in the middle of the container. A flexible ring 32 is provided having two ends 32a, 32b. A force in direction F is applied to both ends 32a, 32b so that the ring 32 when applying the force reduces its diameter and thereby presses the frozen confection 17 towards the centre opening 26.

Figure 12B:
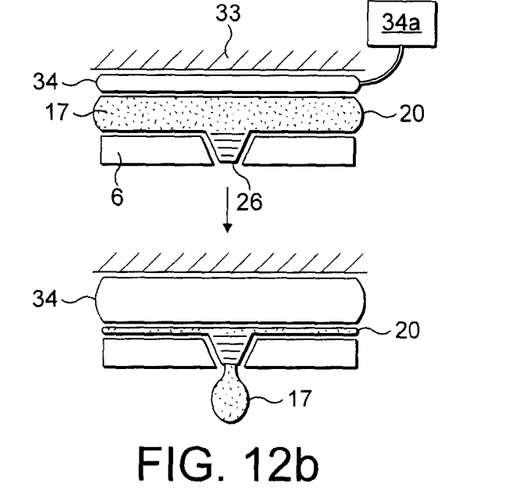

FIG. 12b shows a second embodiment of a dispensing mechanism according to the present invention.

The upper part of FIG. 12b shows the case where the frozen confection 17 has been readily prepared within the container 20. The container 20 is provided on the cooling element 6. Above the container 20 an inflatable balloon 34 is provided which is connected to a gas supply 34a, e. g. a supply of air or any other gas. Above the inflatable balloon 34 a barrier 33 is provided which is adapted to hold out the force of the inflatable balloon 34 when being inflated.

The bottom part of FIG. 12b shows the case where the inflatable balloon 34 is inflated and thereby squeezes the container 20, so that the frozen confection 17 is dispensed through the opening 26. It is to be noted that the embodiment using an inflatable balloon can also be used with any other type of opening, i. e. an opening provided in the middle, at the side or within a boarder 31 of the container 20.

Figure 12C:
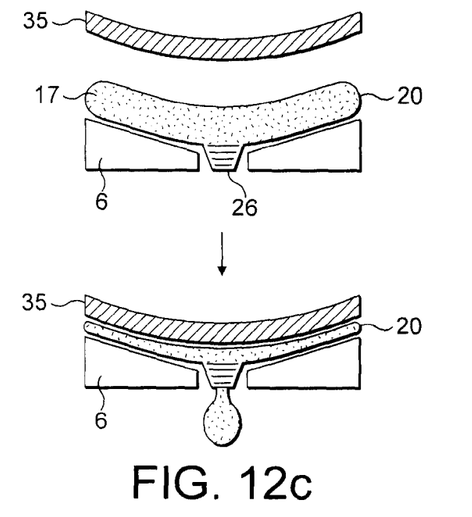

FIG. 12c shows a further embodiment of a dispensing mechanism according to the present invention.

In this specific example, the cooling element 6 has a concave shape and the upper part of FIG. 12c shows the case where the frozen confection 17 is readily prepared and contained within the container 20. A convex plate 35 is provided which can be forced down onto the container 20 and which has a shape substantially equal to the shape of the cooling element 6. As shown in the lower part of FIG. 12c, when the convex plate 35 is pushed down onto the concave container 20, the container 20 is squeezed and the frozen confection is dispensed through the opening 26 from the container 20.

Figure 12D:
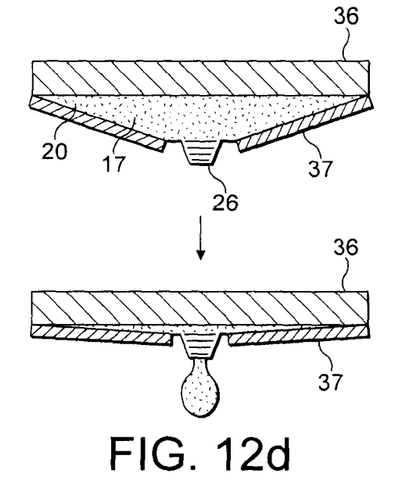

FIG. 12d shows a further embodiment of a dispensing mechanism according to the present invention. In this case the container 20 is provided between a for example magnetic barrier 36 and a magnetic plate 37. Magnetic plate 37 comprises two parts which are provided on both sides of the opening 26 of the container 20. If the mechatronic system is activated then as shown in the lower part of FIG. 12d the plates are pushed towards the magnetic barrier 36 and thereby the container 20 is squeezed so that the frozen confection 17 is dispensed from the container. Alternatively, it is possible to provide a bimetal plate 37 which automatically reacts upon reaching a desired temperature.

Figure 12E:
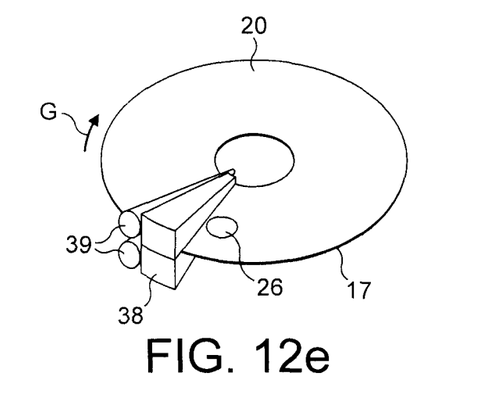

FIG. 12e shows a further embodiment of a dispensing mechanism according to the present invention. After the frozen confection 17 is prepared, a barrier 38 slides from the side to the centre of the container 20. A pair of cones 39 then squeezes the flexible container casing, rotates in direction as shown by arrow G and therefore forces the frozen confection towards the outlet 26 near the barrier 38.

Figure 12F:
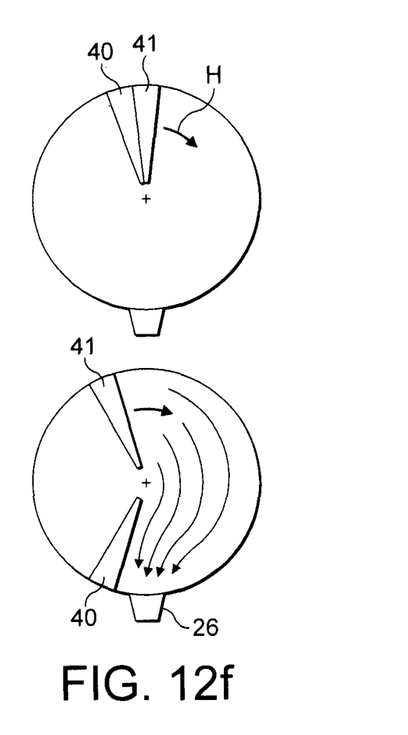

FIG. 12f shows a further embodiment of a dispensing mechanism according to the present invention. In this case again a pair of cones is provided, but in this embodiment the pair of cones lies on the same side of the container casing and comprises a first processing cone 40 and a second processing cone 41. The cones can be split and moved independently from each other. This is shown in the lower picture of FIG. 12f. The first processing cone 40 can either be maintained at a fixed position or moved in reverse direction to the second processing cone 41 which is moved in direction indicated by arrow H. For dispensing cone 40 remains stationary and builds a barrier for the confection while cone 41 continues to move and forces the frozen confection towards cone 40 and the opening 26. In this embodiment the opening 26 is provided at the side or at the border of the container 20 so that the frozen confection 17 can be forced through the side opening.

Figure 12G:
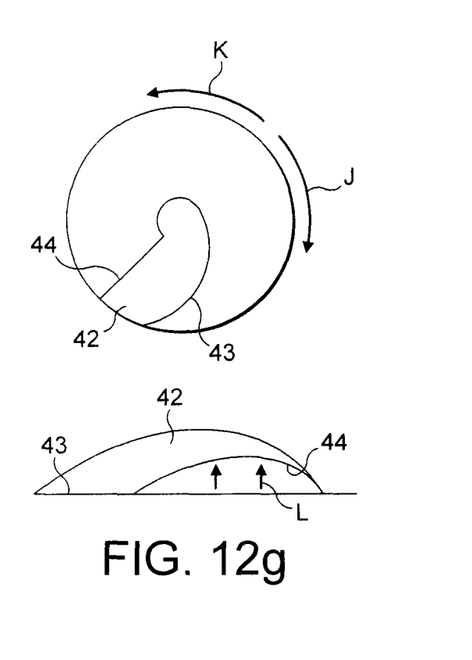

FIG. 12g shows a further embodiment of a dispensing mechanism according to the present invention. In this embodiment a partial sheet 42 is provided at the bottom of the container 20, i.e. in-between the two sides of the container 20. The partial sheet 42 has a fixed side 43 which is fixedly attached to the bottom of the container 20. The partial sheet 42 further has an open side 44 which is not fixedly attached to the bottom of the container 20, so that the partial sheet 41 forms an outlet channel. The partial sheet 42 covers the opening 26. If now during the preparation of the frozen confection 17 the processing unit 3 moves the ingredients 15 into a direction as indicated with arrow J, then the partial sheet 42 is pressed onto the opening 26 and, so that the ingredients 15 run across the partial sheet 42 without any effect. If the frozen confection 17 is readily prepared, then the movement direction of the processing unit 3 and/or the dispensing unit 5 is reversed and the frozen confection 17 is moved into the direction as indicated with arrow K. The frozen confection 17 thereby approaches the partial sheet 42 from the side where the partial sheet 42 has the open side 44 so that as shown in the bottom part of FIG. 12c the open side 44 is pushed upwards into direction shown with arrows L so that the opening 26 is not covered anymore and the frozen confection 17 will enter the outlet channel formed by the partial sheet. Due to the fixed side 43 of the pouch the frozen confection 17 will be forced to be dispensed through the opening 26.

Figure 12H:
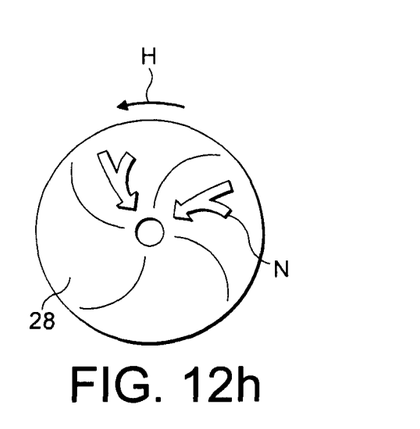

FIG. 12h shows a further embodiment of a dispensing mechanism according to the present invention. As already explained flow lines 28 can be provided within the container 20 forcing the frozen confection into a specific direction as indicated with arrow N in case that the processing unit 3 and/or the dispensing unit 5 moves the frozen confection 17 into a direction as indicated with arrow M.

Figure 12I:
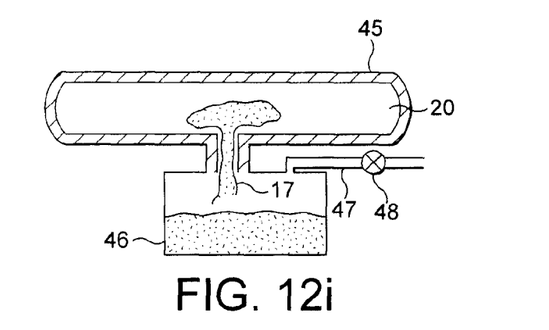

FIG. 12i shows a further embodiment of a dispensing mechanism according to the present invention. In this case the container 20 is put into a sealed chamber 45 which can be hermetically sealed and is connected to a receptacle 46. A vacuum pump 48 via a conductor 47 is connected to the container and sucks out the frozen confection 17 from the container 20 into the receptacle 46.

Figure 12J:
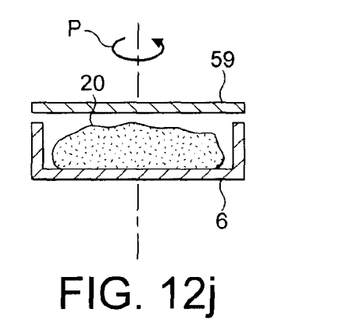

FIG. 12j shows a further embodiment of a dispensing mechanism according to the present invention. After the preparation of the frozen confection 17 a cover plate 59 is provided onto the container 20. The cover plate 59 can also be omitted and instead the processing unit 3 can be used as cover plate. The container 20 is then rotated rapidly in direction as shown by arrow P and by centrifugal force the frozen confection is pressed out of the container 20.

Figure 12K:
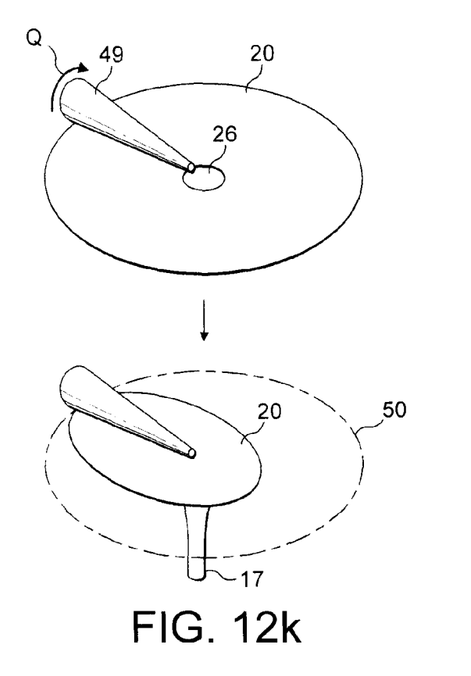

FIG. 12k shows a further embodiment of a dispensing mechanism according to the present invention. In this case a wring cone 49 is provided which is adapted to role or wring the flexible container 20 so that the frozen confection 17 is pressed out of the opening 26. This is shown in the bottom part of FIG. 12k, where the rolled container 20 is shown and a dashed line 50 indicates the former shape of the container 20.

Figure 12L:
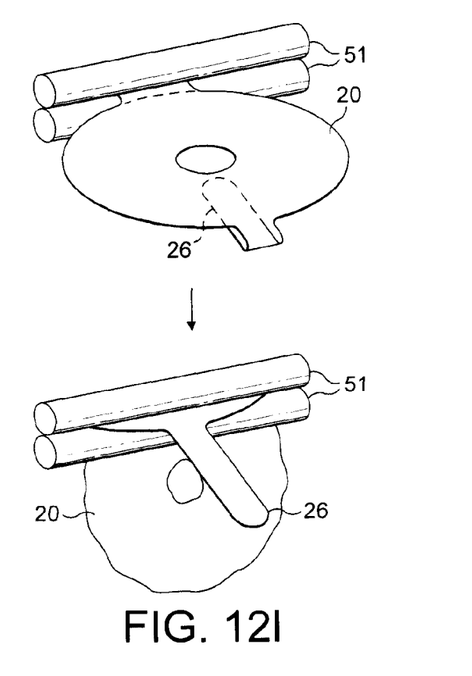

FIG. 12l shows a further embodiment of a dispensing mechanism according to the present invention. In this case two rotatable cones 51 are provided and the container 20 is clamped between the rotatable cones 51. The rotatable cones 51 are then rotated in opposite direction so that the container 20 wanders through the rotatable cones so that the frozen confection 17 can be dispensed through a side opening 26 of the container 20.

Figure 13:
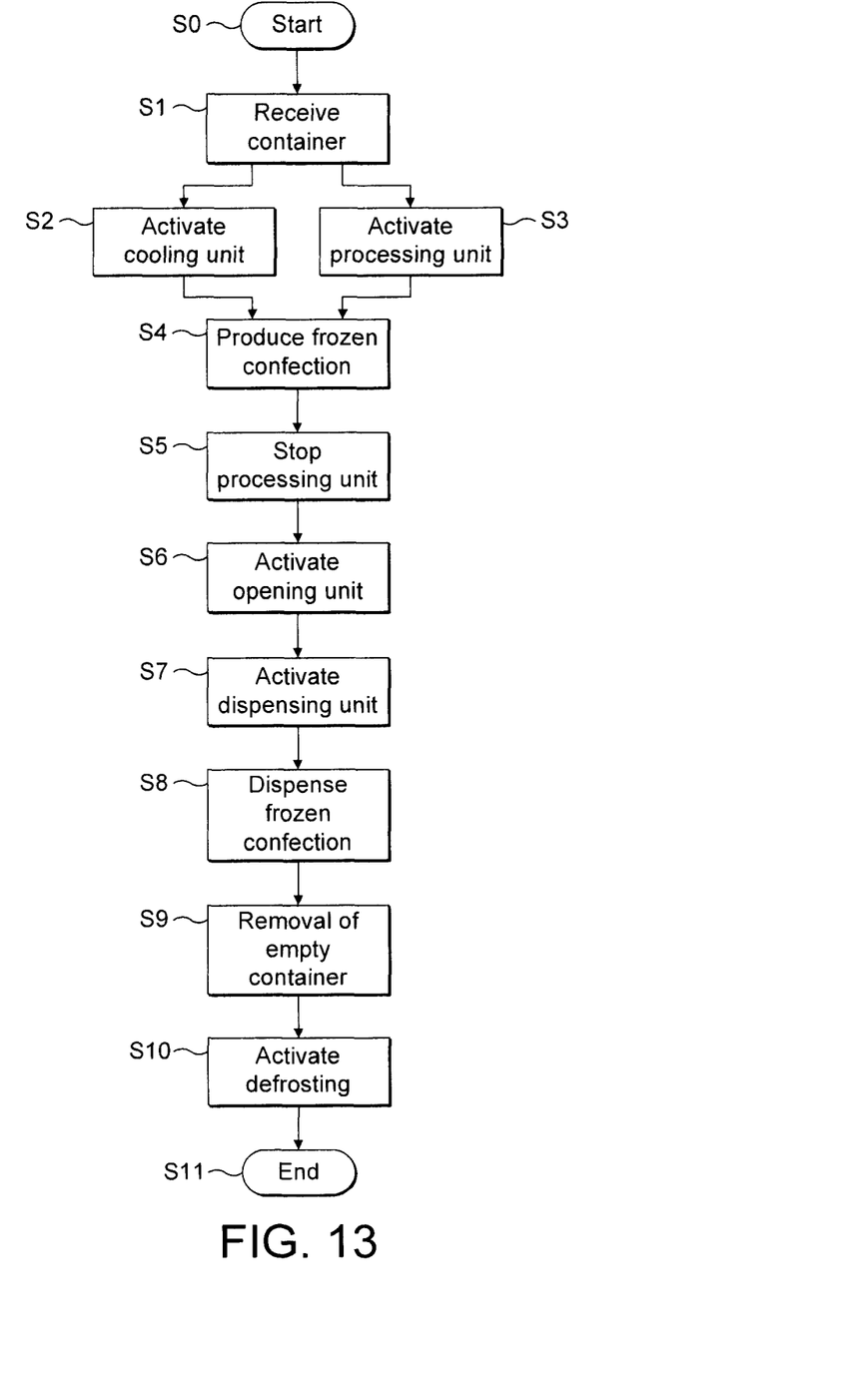
FIG. 13 is a flow chart showing schematically the process steps for preparing a frozen confection according to the present invention.

FIG. 13 shows a flow chart with an overview over the different steps for preparing a frozen confection 17 according to the present invention.

The process starts in step S0.

In step S1 the container 20 is received by the device 1, i.e. is put onto the cooling element 6. In the following step S2 the cooling unit 8 is activated and at the same time in step S3 the processing unit 3 is activated. In the next step S4 the frozen confection 17 is produced by cooling the ingredients 15 and applying a mechanical force to the container 20.

In the next step S5 the processing unit is stopped and in step S6 the opening unit 4 can be activated in order to open the container 20. As previously described this step can also be omitted and accomplished manually by a customer.

In the next step S7 the dispensing unit 5 is then activated and in the following step S8 the frozen confection 17 is dispensed from the container 20.

In step S9 the empty container 20 is then removed from the device 1. Optionally, then a defrosting step S10 can be accomplished by activating the defrosting system, if present. This has the advantage that it is assured that there is no frosting on the container holder surface in readiness to receive the next container. The defrosting step can also be provided between or during other steps and/or between or during a plurality of steps. But in the preferred embodiment defrosting is accomplished after each production cycle. The process ends in step S11 and the device 1 is thus ready for receiving a new container and preparing a further single portion of freshly made frozen confection.

The present invention thus enables the preparation of a frozen confection, which can be freshly prepared in single portions by a closed system. The containers provide a pre-dosed packaging containing all the necessary ingredients for preparing the frozen confection. The frozen confection is prepared inside the container.

With the present invention it is further possible to prepare several different types of frozen confections in a short time. Since the container is dispensable and does not need to be cleaned and since most parts of the device do not come into contact with the frozen confection, the handling is simplified and the need for cleaning is reduced.

REFERENCE SIGNS (1) device
(2) motor
(3) processing unit
(4) opening unit
(5) dispensing unit
(6) cooling element
(7) retainer
(8) cooling unit
(9) activation mechanism
(10) condenser
(11) compressor
(12) lever
(13) connector
(14) pivot
(15) ingredients
(16) protruding portion
(17) frozen confection
(20) container
(21) gap
(22) exoskeleton
(23) ring
(24) bar
(25) flexible casing
(26) opening
(27) aperture
(28) flow lines
(29) barrier
(30) central portion
(31) border
(32) flexible ring
(32a) first end of 32
(32b) second end of 32
(33) barrier
(34) inflatable balloon
(34a) gas supply
(35) convex plate
(36) magnetic barrier
(37) magnetic plate
(38) barrier
(39) pair of cones
(40) first processing cone
(41) second processing cone
(42) partial sheet
(43) fixed side of 42
(44) open side of 42
(45) sealed chamber
(46) receptacle
(47) conductor
(48) pump (49) ring cone
(50) shape of 20
(51) rotatable pair of cones
(52) support
(53) recess
(54) casing
(55) hole
(56) upper component
(57) perforation
(58) pin
(59) cover plate

The invention claimed is:

1. A device for preparing a frozen confection, the device comprising:
   a cooling element designed to receive a flexible container so dimensioned as to contain only an individual portion of liquid ingredients comprising 80 ml to 200 ml for producing a frozen confection when cooled and mechanically forced;
   a cooling unit for cooling the cooling element;
   a connection feature selected from the group consisting of holes for attaching respective bars of the container and pins fitting respective perforations of the container, the connection feature allowing heat energy to be transferred from the ingredients to the cooling unit for freezing the ingredients, and the cooling element being a flat plate and comprising an aperture that extends through the cooling element and around which the connection feature is positioned;
   a processing unit for applying a mechanical force to the container;
   a lever that is pivotably arranged to move the processing unit in a lateral direction parallel to a pivot axis from an open configuration into a preparation configuration for freezing the liquid ingredients;
   a support extending from a bottom of the device; and
   a protruding portion above and parallel to the support with the cooling element integrated into the protruding portion, the protruding portion comprising a recess to receive the container.

2. The device according to claim 1 comprising the bars for attaching the container to respective holes within the device for preparing the frozen confection.

3. The device according to claim 1, wherein the frozen confection is selected from the group consisting of ice cream, sorbet, sherbet, water ice, frozen yoghurt, frozen dairy, soft ice, Mellorine, frozen custard, non-dairy frozen confection, milk ice, ice lolly, gelato and frozen jelly.

4. The device according to claim 1, comprising an opening unit for opening the container after the preparation of the frozen confection, a dispensing unit for dispensing the prepared frozen confection from the container.

5. The device according to claim 1, comprising an activation mechanism for manually activating the components of the device.

6. The device according to claim 1 comprising the perforations for attaching the container to respective pins at the device for preparing the frozen confection.

7. The device according to claim 1 comprising:
   an opening unit for opening the container after the preparation of the frozen confection;
   a dispensing unit for dispensing the prepared frozen confection from the container; and
   a motor for driving the processing unit.

8. The device according to claim 1, wherein the container is in direct contact with the cooling element.

9. The device according to claim 1, wherein the recess is positioned adjacent to the cooling element along a direction from the support to the protruding portion.

10. A method for preparing an individual portion of a frozen confection comprising 80 ml to 200 ml, the method comprising the steps of:
    providing a flexible container so dimensioned as to contain only an individual portion of liquid ingredients comprising 80 ml to 200 ml for producing a frozen confection when cooled and mechanically forced;
    attaching the container to the device via a connection feature selected from the group consisting of holes in the device fitting respective bars of the container and pins of the device fitting respective perforations of the container, thereby integrating the container into a protruding portion above and parallel to a support extending from a bottom of the device, the protruding portion comprising a recess to receive the container, the connection feature allowing heat energy to be transferred from the ingredients to an external heat sink for freezing the ingredients;
    positioning the container in direct contact with a cooling element that is a flat plate, whereupon the liquid ingredients are frozen, thereby forming the frozen confection; and
    moving the processing unit by a pivotable lever in a lateral direction parallel to a pivot axis from an open configuration into a preparation configuration for applying a mechanical force to the container.

* * * * *